United States Patent
Chen et al.

(10) Patent No.: US 11,692,423 B1
(45) Date of Patent: Jul. 4, 2023

(54) METHOD FOR REALIZING UNIFORM STIMULATION FOR THE OIL AND GAS WELL BY LOW-COST MULTI-STAGE FRACTURING

(71) Applicant: Southwest Petroleum University, Chengdu (CN)

(72) Inventors: Xiyu Chen, Chengdu (CN); Yitao Huang, Chengdu (CN); Yongming Li, Chengdu (CN); Huibo Wen, Chengdu (CN); Yu Peng, Chengdu (CN); Youshi Jiang, Chengdu (CN); Jinzhou Zhao, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/694,527

(22) Filed: Mar. 14, 2022

(30) Foreign Application Priority Data

Dec. 23, 2021 (CN) .......................... 202111593380.0

(51) Int. Cl.
*E21B 43/267* (2006.01)
*E21B 43/26* (2006.01)

(52) U.S. Cl.
CPC .......... *E21B 43/261* (2013.01); *E21B 43/267* (2013.01); *E21B 2200/20* (2020.05)

(58) Field of Classification Search
None
See application file for complete search history.

(56) References Cited

U.S. PATENT DOCUMENTS

| 2013/0220619 A1* | 8/2013 | Chen | C09K 8/74 166/305.1 |
| 2019/0136680 A1* | 5/2019 | Madasu | E21B 43/12 |
| 2020/0386081 A1* | 12/2020 | Chen | E21B 43/26 |

FOREIGN PATENT DOCUMENTS

| CN | 104314546 A | 1/2015 |
| CN | 111005708 A | 4/2020 |
| CN | 111428425 A | 7/2020 |

* cited by examiner

*Primary Examiner* — Andrew Sue-Ako

(57) ABSTRACT

The present invention discloses a method for realizing uniform stimulation for the oil and gas well by low-cost multi-stage fracturing, comprising the following steps: first calculate and predict the inlet widths of the fracture created in the planned hydraulic fracturing; then design the plugging scheme for blocking the fracture inlet after each fracturing treatment; the selected plugging particles are composed of filling particles and skeleton particles, with designed plugging scheme; after complete the design of plugging scheme, perform the fracturing treatment to create hydraulic fracturing in the reservoir; skeleton particles and filling particles are added into the fractures successively according to plan. The present invention provides a multi-stage single-cluster fracturing method, with the advantages of controllable fracture sizes and low cost. The present invention can realize a good uniformity of stimulation for the oil and gas wells.

6 Claims, 5 Drawing Sheets

METHOD FOR REALIZING UNIFORM STIMULATION FOR THE OIL AND GAS WELL BY LOW-COST MULTI-STAGE FRACTURING

CROSS-REFERENCE TO RELATED APPLICATIONS

The application claims priority to Chinese patent application No. 202111593380.0, filed on Dec. 23, 2021, the entire contents of which are incorporated herein by reference.

TECHNICAL FIELD

The present invention pertains to the technical field of oil and gas field development, in particular to a method for realizing uniform stimulation for the oil and gas well by low-cost multi-stage fracturing.

BACKGROUND

Horizontal well fracturing is a key technology for stimulating low-permeability reservoirs. The technology is expected to create a number of densely-distributed hydraulic fractures in the reservoir, form a large number of oil and gas flow channels and increase the production. For a horizontal well, whether the stimulation is uniform is one of the core factors to determine the performance of fracturing. However, uneven fracture growth is a serious problem in the most widely used multi-stage multi-cluster fracturing. Due to the heterogeneity of reservoir rocks and the stress interference of inter-fracture, it is difficult for most perforation clusters to obtain the supply of fracturing fluid, and many scheduled fractures cannot initiate and extend. The uneven fracture growth seriously affects the production of the whole well and causes the waste of construction cost. Therefore, one of the most important optimization objectives in the fracturing engineering is to promote the uniformity of fracturing stimulation for the oil and gas well.

In order to ensure the uniform stimulation for the oil and gas well, many scholars and engineers have designed the limited-entry technique and fluid diversion technique, etc. to alleviate the uneven growth of fractures in the multi-stage multi-cluster fracturing. Another option is to use multi-stage single-cluster fracturing technique, where only one cluster is fractured each time. Because there is no competition between perforation clusters for fluid supply, engineers can directly control the size of each hydraulic fracture, eliminating uneven fracture growth and achieving uniform stimulation for well. However, conventional single-cluster fracturing requires the use of a large number of plugging tools such as bridge plug to mechanically plug each fracture. Due to this reason, this method cannot be used on site due to the high cost.

SUMMARY

The purpose of the present invention is to provide a method for realizing uniform stimulation for the oil and gas well by low-cost multi-stage fracturing. The uniform stimulation for the oil and gas well is realized through a low-cost single-cluster fracturing method. Instead of using the traditional plugging tools such as bridge plug, a plugging structure is formed by high-concentration plugging particles at the end of each fracturing treatment, to block the fracture.

In a method for realizing uniform stimulation for the oil and gas well by low-cost multi-stage fracturing, first design the required plugging procedure for blocking the fractures and then use the coiled tubing tools to successively complete the perforation, fracturing and plugging. Repeat these steps and complete the fracturing operation the oil and gas well with the advantages of controllable hydraulic fracture, low cost and uniform stimulation.

Specific methods and steps are as follows:

Step 1: Collect the geological and engineering parameters of oil and gas wells to be fractured, and adopt the fracture model in Equation (1) to roughly estimate the inlet widths of the fractures when the fracturing of each cluster of fractures is completed:

$$w_i = 2.18 \left[ \frac{Q^2(1-v^2)\mu}{Eh} \right]^{0.2} t^{0.2} \quad (1)$$

Where:
$w_i$ is the inlet width of fracture, in m;
E is Young's modulus of reservoir rock, in MPa;
Q is the pump rate of fracturing fluid, in m³/s;
μ is the viscosity of fracturing fluid, in MPa·s;
v is the Poisson's ratio of rock, dimensionless;
h is the reservoir thickness, in m;
t is the fracturing time, in s.

Step 2: Design the plugging scheme for blocking the fracture inlet after each fracturing treatment. The selected plugging particles are composed of skeleton particles and filling particles. Initially select a group of proppant particles with a larger particle diameter (usually about 40 meshes) as the skeleton particles. The particle diameter of skeleton particles selected here is a rough value. The particle diameter fluctuates up and down. Select a group of soluble particles with particle diameter less than ⅓ of that of the skeleton particles as the filling particles. Take two groups of particle samples for further fine screening to determine the particle diameter composition. Calculate the harmonic mean of particle diameter of the two groups of particles as the average diameter of the plugging particles:

$$a = \frac{(v_1 + v_2 + L + v_n)T + (g_1 + g_2 + L + g_m)(1-T)}{\left(\frac{v_1}{b_1} + \frac{v_2}{b_2}L + \frac{v_n}{b_n}\right)T + \left(\frac{g_1}{c_1} + \frac{g_2}{c_2}L + \frac{g_m}{c_m}\right)(1-T)} \quad (2)$$

Where:
α is the average diameter of plugging particles, in m;
$b_n$ is the particle diameter of n-th kind of skeleton particles, in m;
$v_n$ is the volume fraction of n-th kind of skeleton particles among all skeleton particles, dimensionless;
$c_m$ is the particle diameter of m-th kind of filling particles, in m;
$g_m$ is the volume fraction of m-th kind of filling particles among all filling particles, dimensionless; T is the volume fraction of filling particles in plugging particles, dimensionless.

Step 3: Check whether the average particle diameter a is greater than ⅕ of the inlet width of fracture expected in Step 1;

$$a > \frac{1}{5} w_i \quad (3)$$

Where:

α is the average diameter of plugging particles, in m;

$w_i$ is the inlet width of fracture, in m;

If the conditions in Equation (3) are met, the average particle diameter calculated in Step 2 corresponds to the optimized particle diameter composition.

If the conditions in Equation (3) are not met, the proppant particles (such as about 20 meshes) with particle diameter greater than the skeleton particles by one level (with mesh smaller than the skeleton particles by one level) are selected as the skeleton particles, and the average particle diameter of plugging particles will be recalculated according to Step 2.

Step 4: Optimize the average diameter of plugging particles based on Step 3, and calculate the sand ratio (volume fraction) of plugging particles required for blocking the fractures:

$$C_o \geq \frac{3}{10}\left(1 - \frac{1}{2}e^{-\frac{w_o}{3.3a}}\right)\left(1 - \frac{a}{w_o}\right)^2 \quad (4)$$

Where:

$C_o$ is the sand ratio of particles required for blocking the fracture;

α is the average diameter of plugging particles, in m;

$w_o$ is the inlet width of fracture, in m.

The value $C_o$ calculated by Equation (4) is the optimized volume fraction of particles.

Step 5: Predict the process of hydraulic fracturing and particle transport and placement based on the hydraulic fracturing model or software simulation. Based on the optimized plugging particle composition and the volume fraction of particles $C_o$ obtained in Steps 3 and 4, calculate whether the volume fraction of particles in the fracture near the wellbore can reaches 60% (the minimum volume fraction required for blocking). For example, the following three-dimensional hydraulic fracturing model can be used for simulation:

$$\frac{\partial w}{\partial t} - \frac{\partial q_s}{\partial s} + i = 0, \frac{\partial wc}{\partial t} - \frac{\partial q_d}{\partial s} + ic = 0 \quad (5)$$

$$c = \frac{C}{0.6}, q_s = \frac{w^3}{12\mu(1-c)^2}\frac{\partial q_p}{\partial s}$$

$$q_d = 1.2c(1-c)^{\frac{1}{10}}q_s - \frac{a^2 w}{48\mu}2.3c(1-c)^2 \Delta\rho g$$

Where:

w is the width of fracture, in m;

t is the time, in s; s is the spatial distance, in m;

i is the injection rate of fracturing fluid, in m/s;

$q_s$ is the flow rate of sand-suspended fracturing fluid, in m/s;

$q_d$ is the particle transport speed, in m/s;

C is the volume fraction of particles among the fracture;

c is the normalized volume fraction of particles among the fracture;

μ is the viscosity of fracturing fluid, in Pa·s;

α is the particle diameter;

Δρ is the density difference between fracturing fluid and particles, in kg/m³;

g is the acceleration of gravity, in m/s².

If the simulation results show that the volume fraction of particles in the fracture near the wellbore fails to reach 60%, further adjust and reselect the skeleton particles with particle diameter greater than the original one by one level (with mesh smaller than the original one by one level), and design again according to Steps 2-5 until the volume fraction of particles can reach 60% in the simulation calculation results.

Step 6: Fracturing: use a coiled tubing to carry the perforating tool to the corresponding depth, perform the cluster of perforations at the target location, open the wellhead valve without removing the coiled tubing from the wellbore after perforation, close the circulating emptying valve, start the fracturing pump trucks one by one, slightly pump the fracturing fluid into the formation till the pressure becomes stable to check that the downhole strings and tools work normally, conduct injection into annulus after successful mini-fracturing test, select a reasonable maximum pump rate based on the friction resistance of downhole string and the formation fracture pressure to initiate and extend the hydraulic fracture, and record the fracture pressure at the moment of fracturing.

The following preparations are required before fracturing:

(1) Prepare the fracturing equipment and materials according to the geological conditions of the reservoir, the design parameters and construction requirements for fracturing, and allocate the personnel matching the scale of treatment.

(2) Well site layout and wellbore preparation: according to the standardized scheme of fracturing of the oil and gas well, install fracturing equipment and set the threshold value of maximum pumping pressure for safe, transport the coiled tubing into wellbore and clean up the well.

(3) Construction inspection: before fracturing treatment, inspect the performance of fracturing truck via fluid circulating, ensure that pipelines for high and low pressures on the ground are unblocked, carry out pressure tests for the wellhead valve and the ground pipelines, with maximum pressure being 1.2 to 1.5 times of the predicted pumping pressure, and keep the pressure for 5 min to ensure that the pressure tests are qualified.

Step 7: Blocking fracture: after the fracture is formed, the pumping pressure and the pump rate of fracturing pump become stable to ensure stable pressure and pump rate, add the sand gradually and evenly. When the injection amount of fluid reaches 80-85% of the designed fluid volume, pump the plugging particles based on the optimized volume fraction of particles $C_o$. After the high-concentration plugging materials used for blocking enter the formation holes, reduce the injection pump rate until all these plugging particles enter the fracture.

Identifying the success of plugging: after adding the sand, enable the bypass of the sand mixer truck and inject the displacing fluid into the wellbore to force all the particles enter the fracture. If the wellbore pressure continues to rise and exceeds the predesignated safe pressure, it is reasonable to assume that the fracture is successfully plugged by the particles.

Step 8: Perform fracturing in sequence: repeat Steps 1-7 until the fracturing of all perforation clusters in the target well is completed;

Step 9: Plugging removal: If necessary, treatment fluid is injected into the wellbore to dissolve the filling particles at fracture inlet to recover the flow channel between each fracture with the wellbore. So far, the low-cost multi-stage single-cluster fracturing of the well has been completed.

Compared with the prior art, the present invention has the following advantages:

1. The method in the present invention can effectively solve the problem of uncontrollable fracture length and uneven fracture growth in the process of traditional multi-stage fracturing, and promote all fractures growing to preset size to realize a uniform stimulation.

2. In the process of fracturing, the method in the present invention can ensure completing all the fracturing treatment by using the coiled tubing. The use of bridge plug can be cancelled by utilizing the high-concentration plugging particles as packer, thereby greatly increasing the convenience of fracturing and reducing the construction cost.

The other advantages, objectives and characteristics of the present invention will be partly reflected by the following description and partly understood by the technical personnel in this field through the study and practice of the present invention.

DETAILED DESCRIPTION OF THE EMBODIMENTS

The preferred embodiments of the present invention are described in combination with the attached drawings. It should be understood that the preferred embodiments described here are only used for describing and explaining the present invention instead of limiting the present invention.

Figure 1:
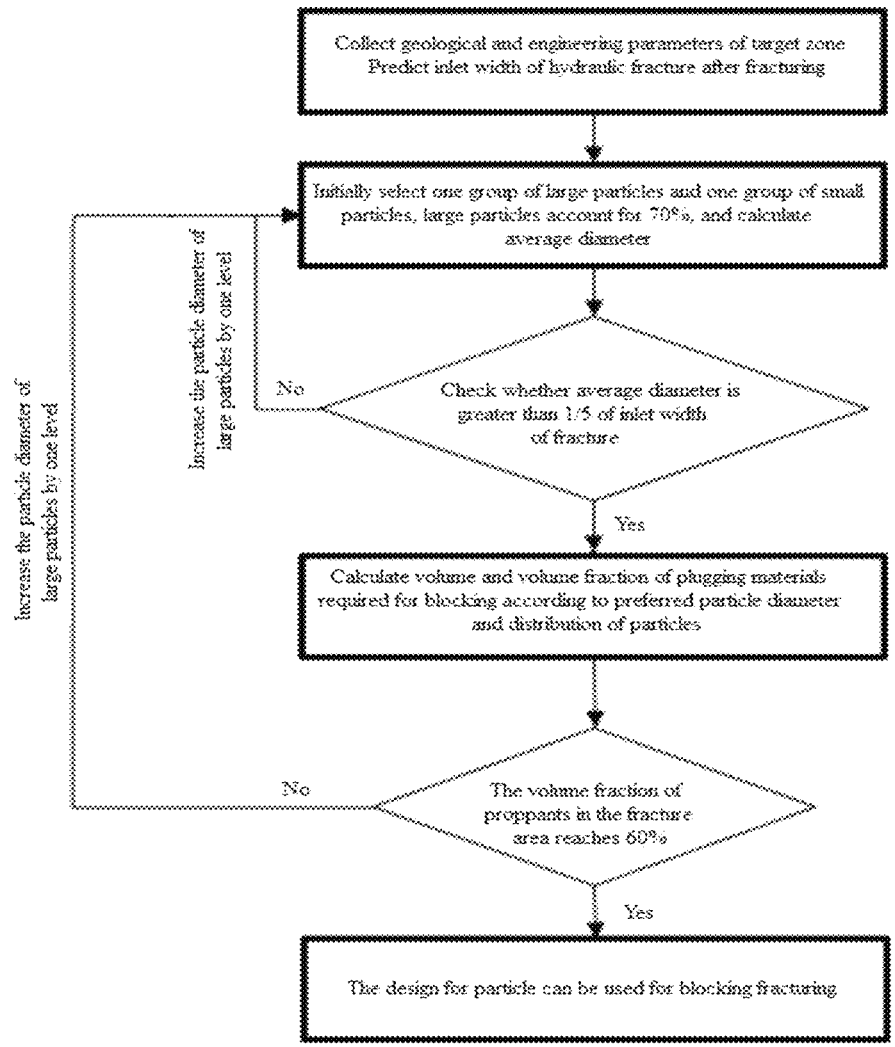
FIG. 1 is the process diagram of optimization calculation for the optimized parameters of plugging particle of the present invention.

FIG. 1 gives the process diagram of optimization calculation for the optimized parameters of plugging particle corresponding to Steps 1-5 of the present invention.

Take a certain stage of shale gas well B in a certain zone of Sichuan as an example. This well is located in a favorable reservoir for shale gas with stable formation structure. In order to make each fracture grow evenly and obtain better fracturing performance, the low-cost single-cluster fracturing process provided by the present invention is selected for fracturing. The specific geological and engineering parameters of the reservoir are shown in Table 1.

TABLE 1

| Key geological and engineering parameters | | | |
|---|---|---|---|
| Maximum horizontal principal stress (MPa) | 60 | Minimum horizontal principal stress (MPa) | 50 |
| Vertical principal stress (MPa) | 75 | Formation porosity (%) | 3 |
| Young's modulus (MPa) | 30000 | Poisson's ratio | 0.38 |
| Fracture toughness of rock (MPa · m$^{1/2}$) | 1.5 | Combined leak-off coefficient (natural fracture/matrix) (m$^3$/s$^{1/2}$) | 2 × 10$^{-5}$ |
| Interlayer stress barrier (MPa) | 5 | Reservoir thickness (m) | 100 |
| Viscosity of fracturing fluid (MPa · s) | 5 × 10$^{-9}$ | Pump rate of fracturing fluid (m$^3$/min) | 5 |
| | | Biot coefficient | 0.6 |
| Density of fracturing fluid (kg/m$^3$) | 1011 | Perforation density (l/m) | 6 |
| | | Effective fracturing time (s) | 1800 |
| Perforation aperture (m) | 0.008 | | |
| Stage spacing (m) | 90 | | |

Step 1: The collected geological and engineering parameters of the target block (Table 1) are substituted into Equation (1), and the predicted value of inlet width of hydraulic fracture calculated by the fracture model is 0.00302 m, that is, 3.02 mm.

Step 2: Two groups of particles (20/40 meshes) and (40/70 meshes) are selected and respectively defined as Group 1 (20/40 meshes) and Group 2 (40/70 meshes). Group 1 (20/40 meshes) is selected as the skeleton particles, while Group 2 (40/70 meshes) is selected as the filling particles. The average diameter of particles with 20/40 meshes is 0.759 mm, while the average diameter of particles with 40/70 meshes is 0.274 mm. The average diameter of Group 2 (40/70 meshes) is greater than ⅓ of the average diameter of Group 1 (20/40 meshes), which meets the requirements. The two groups of proppant samples are subject to further fine screening to obtain specific particle composition, with the ratio of skeleton particles with 20/40 meshes being 70%. For the particle diameter corresponding to mesh during screening, see Table 2 for the correspondence between particle diameter and mesh.

TABLE 2

| Correspondence between particle diameter and mesh | | | | | | | |
|---|---|---|---|---|---|---|---|
| Particle diameter (mm) | 2.38 | 2.00 | 1.68 | 1.41 | 1.68 | 1.19 | 1.00 |
| Mesh | 8 | 10 | 12 | 14 | 12 | 16 | 18 |
| Particle diameter (mm) | 0.841 | 0.707 | 0.400 | 0.297 | 0.250 | 0.210 | 0.177 |
| Mesh | 20 | 25 | 40 | 50 | 60 | 70 | 80 |

The average plugging particle diameter a of the two groups of mixed particles, calculated by Equation (2), is 0.613 mm.

Step 3: The average diameter of plugging particles (a=0.613 mm) is greater than ⅕ of the fracture width (3.02 mm), that is, $5\alpha > w_i$, so the size of plugging particles meets the requirements.

Step 4: The volume fraction of particles $C_o$ required for realizing the single-cluster fracturing with high-concentration plugging particles, calculated by Equation (4), is at least 0.2821.

Figure 2:
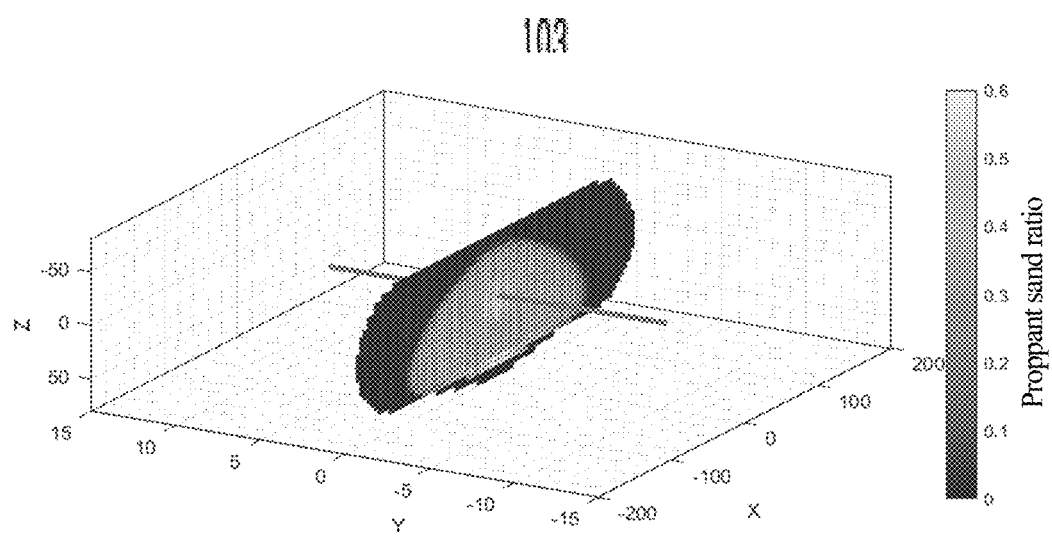
FIG. 2 is the distribution diagram of sand ratio for single fracture in low-cost single cluster fracturing.

Step 5: The 3D hydraulic fracturing model shown in Equation (5) is used to simulate and calculate the volume fraction of particles in the fracture near the wellbore (greater than 0.6) (as shown in FIG. 2), meeting the required volume fraction.

Step 6: First perform the pre-fracturing preparations, including: construction preparations: (1) Preparing the fracturing equipment and materials according to the geological conditions of the reservoir, the design parameters and construction requirements for fracturing, and allocate the personnel matching the scale of treatment. (2) Well site layout and wellbore preparation: according to the standardized scheme of fracturing of the oil and gas well, install fracturing equipment and set the threshold value of maximum pumping pressure for safe, transport the coiled tubing into wellbore and clean up the well. (3) Construction inspection: before fracturing treatment, inspect the performance of fracturing truck via fluid circulating, ensure that pipelines for high and low pressures on the ground are unblocked, carry out pressure tests for the wellhead valve and the ground pipelines, with maximum pressure being 1.2 to 1.5 times of the predicted pumping pressure, and keep the pressure for 5 min to ensure that the pressure tests are qualified.

Perform the fracturing: use a coiled tubing to carry the perforating tool to the corresponding depth, perform the cluster of perforations at the target location, open the wellhead valve without removing the coiled tubing from the wellbore after perforation, close the circulating emptying valve, start the fracturing pump trucks one by one, slightly pump the fracturing fluid into the formation till the pressure becomes stable to check that the downhole strings and tools work normally, conduct injection into annulus after successful mini-fracturing test, select a reasonable maximum pump rate based on the friction resistance of downhole string and the formation fracture pressure to initiate and extend the hydraulic fracture, and record the fracture pressure at the moment of fracturing.

Step 7: Blocking fracture: after the fracture is formed, the pumping pressure and the pump rate of fracturing pump become stable to ensure stable pressure and pump rate, add the sand gradually and evenly. When the injection amount of fluid reaches 80-85% of the designed fluid volume, pump the plugging particles based on the optimized volume fraction of particles $C_o$. After the high-concentration plugging materials used for blocking enter the formation holes, reduce the injection pump rate until all these plugging particles enter the fracture.

Identifying the success of plugging: after adding the sand, enable the bypass of the sand mixer truck and inject the displacing fluid into the wellbore to force all the particles enter the fracture. If the wellbore pressure continues to rise and exceeds the predesignated safe pressure, it is reasonable to assume that the fracture is successfully plugged by the particles. Then prepare the construction materials for the fracturing of next fracture.

Figure 3:
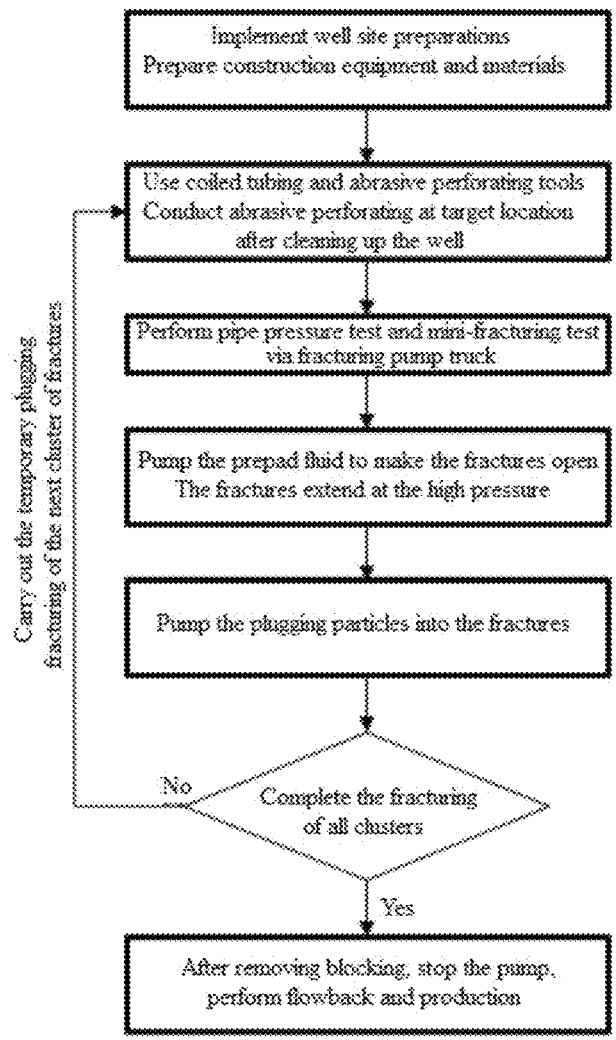
FIG. 3 is the process diagram of low-cost single cluster fracturing.

Step 8: Proceed to the subsequent steps in sequence from Step 1 according to the basic geological conditions where the next cluster of fractures are located until the fracturing of all fractures in the target well is completed. The fracturing construction process is as shown in FIG. 3.

Step 9: Plugging removal: If necessary, treatment fluid is injected into the wellbore to dissolve the filling particles at fracture inlet to recover the flow channel between each fracture with the wellbore. So far, the low-cost multi-stage single-cluster fracturing of the well has been completed.

Figure 4:
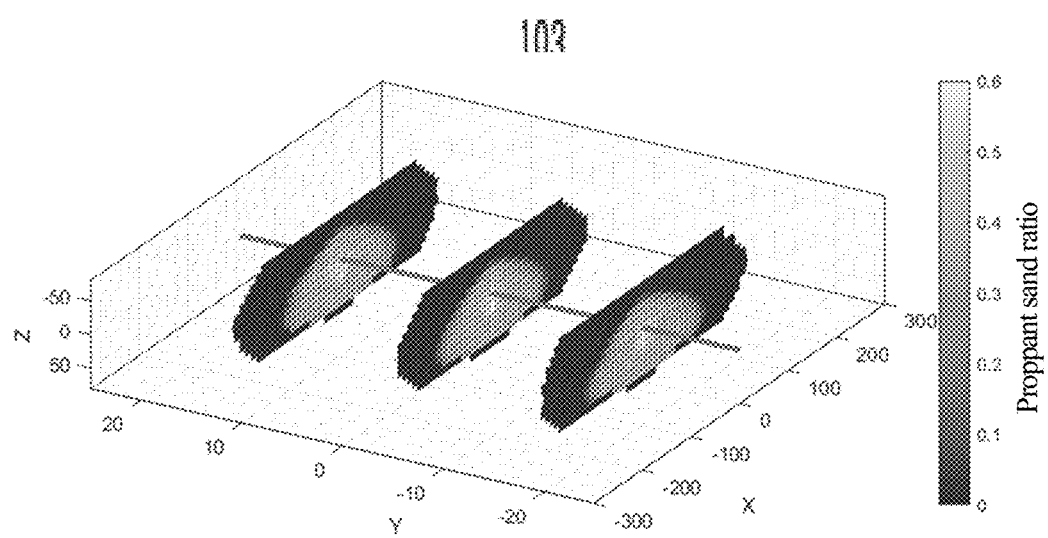
FIG. 4 is the diagram of three simulated hydraulic fractures in low-cost single-cluster fracturing.
Figure 5:
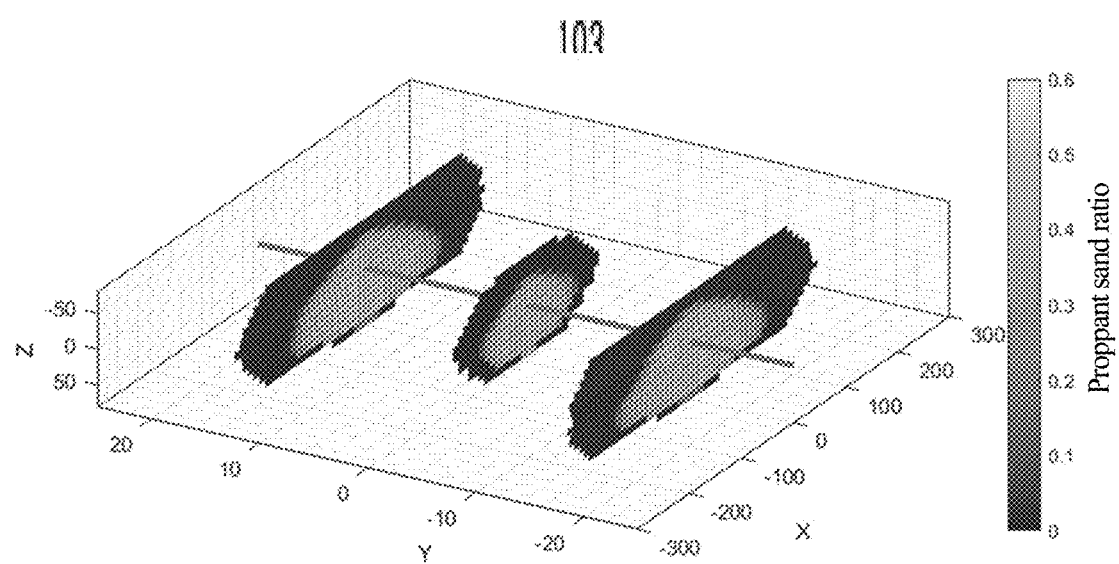
FIG. 5 is the diagram of three simulated hydraulic fractures in traditional multi-cluster fracturing.

To compare the performance of traditional multi-cluster fracturing with the single-cluster fracturing in the present invention, 3D simulated fracture geometries creating by two methods are respectively presented. By the method provided in the present invention, all fractures are fractured in turn, and the fracture lengths are controllable. After the fracturing of whole well is completed, it can be found that the difference of fracture lengths are small, and the fracturing performance is good (as shown in FIG. 4). After the traditional multi-cluster fracturing method is used to carry out the fracturing operation, there are significant differences in the lengths of three fractures. The fracture lengths are relatively uncontrollable and highly uneven, resulting in a poor fracturing performance (as shown in FIG. 5).

The above are not intended to limit the present invention in any form. Although the present invention has been disclosed as above with embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. A method for realizing uniform stimulation for an oil and gas well comprising a wellbore by multi-stage fracturing, comprising the following steps:

Step 1: Calculating and predicting the inlet widths of a fracture $w_i$ created in a planned hydraulic fracturing treatment, with Equation (1);

$$w_i = 2.18\left[\frac{Q^2(1-v^2)\mu}{Eh}\right]^{0.2} t^{0.2} \tag{1}$$

Where: $w_i$ is an inlet width of the fracture, in m; E is Young's modulus of reservoir rock, in MPa; Q is a pump rate of a fracturing fluid, in m³/s; µ is a viscosity of the fracturing fluid, in MPa·s; v is the Poisson's ratio of the reservoir rock, dimensionless; h is a reservoir thickness, in m; and t is a fracturing time, in s;

Step 2: Designing a plugging scheme for blocking the fracture inlet after each fracturing treatment; wherein selected plugging particles are composed of skeleton particles and filling particles; the filling particles are a soluble fluid diverting agent, and the filling particles diameter is less than ⅓ of that of the skeleton particles; the filling particles and the skeleton particles are respectively taken for fine screening to determine their particle diameter composition and classify as different kinds; and calculating the harmonic mean of diameters for the particles according to Equation (2), as the average diameter of the plugging particles:

$$a = \frac{(v_1 + v_2 + L + v_n)T + (g_1 + g_2 + L + g_m)(1-T)}{\left(\frac{v_1}{b_1} + \frac{v_2}{b_2}L + \frac{v_n}{b_n}\right)T + \left(\frac{g_1}{c_1} + \frac{g_2}{c_2}L + \frac{g_m}{c_m}\right)(1-T)} \tag{2}$$

Where: a is an average diameter of the plugging particles, in m; $b_n$ is a particle diameter of n-th kind of skeleton particles, in m; $v_n$ is a volume fraction of n-th kind of skeleton particles among all the skeleton particles, dimensionless; $c_m$ is a particle diameter of m-th kind of filling particles, in m; $g_m$ is a volume fraction of m-th kind of filling particles among all the filling particles, dimensionless; and T is a volume fraction of the filling particles in the plugging particles, dimensionless;

Step 3: Checking whether the average particle diameter a is greater than ⅕ of the inlet width of fracture calculated in Step 1:

$$a > \frac{1}{5} w_i \quad (3)$$

If the conditions in Equation (3) are met, the average particle diameter a is selected as an optimized average particle diameter for plugging, and its corresponding particle composition is selected as an optimized particle composition; if the conditions in Equation (3) are not met, larger skeleton particles will be reelected, and the average particle diameter of plugging particles will be recalculated according to Step 2 until the conditions in Equation (3) are met;

Step 4: Calculating an optimized volume fraction $C_o$ of plugging particles required for blocking the fractures:

$$C_o \geq \frac{3}{10} \left(1 - \frac{1}{2} e^{-\frac{w_o}{3.3a}}\right) \left(1 - \frac{a}{w_i}\right)^2 \quad (4)$$

Where: α is the average diameter of plugging particles, in m; and $w_i$ is the inlet width of fracture, in m;

Step 5: Based on the optimized particle composition and the optimized volume fraction $C_o$, using a hydraulic fracturing model to simulate a fracturing and plugging process and checking whether the volume fraction of particles in the fracture near the wellbore can reach 60%; if the volume fraction fails to reach 60%, larger skeleton particles will be reelected, and Steps 2-5 are repeated until the volume fraction of particles in the fracture near the wellbore can reach 60% in the simulation;

Step 6: After completing the design of the plugging scheme, performing the planned fracturing treatment to create hydraulic fracturing in the reservoir;

Step 7: When the injection amount of fracturing fluid reaches 80-85% of the designed volume, pumping the plugging particles according to the optimized design to block the fracture; After successful plugging, performing a next fracturing treatment for a subsequent perforation cluster;

Step 8: Repeat Steps 1-7 until fracturing of all perforation clusters in the oil and gas well is completed;

Step 9: If necessary, treatment fluid is injected into the wellbore to dissolve the filling particles at the fracture inlet to recover a flow channel between each fracture with the wellbore.

2. The method for realizing uniform stimulation for the oil and gas well by multi-stage fracturing according to claim 1, wherein in the Step 2, proppant particles within a particle diameter range of 30-40 mesh are initially selected as skeleton particles.

3. The method for realizing uniform stimulation for the oil and gas well by multi-stage fracturing to claim 1, wherein in the Step 5, the hydraulic fracturing model used is a three-dimensional hydraulic fracturing model:

$$\frac{\partial w}{\partial t} - \frac{\partial q_s}{\partial s} + i = 0, \frac{\partial wc}{\partial t} - \frac{\partial q_d}{\partial s} + ic = 0 \quad (5)$$

$$q_d = 1.2c(1-c)^{\frac{1}{10}} q_s - \frac{a^2 w}{48\mu} 2.3c(1-c)^2 \Delta \rho g$$

Where: w is the width of the fracture, in m; t is the time, in s; s is the spatial distance, in m; i is the injection rate of fracturing fluid, in m/s; $q_s$ is the flow rate of sand-suspended fracturing fluid, in m/s; $q_d$ is the particle transport speed, in m/s; C is the volume fraction of particles among the fracture; c is the normalized volume fraction of particles among the fracture; μ is the viscosity of fracturing fluid, in Pa·s; a is the particle diameter; μρ is the density difference between fracturing fluid and particles, in kg/m³; and g is the acceleration of gravity, in m/s².

4. The method for realizing uniform stimulation for the oil and gas well by multi-stage fracturing according to claim 1, wherein in the Step 7, the method for identifying the success of plugging is as follows: after the completion of plugging, enabling bypass of a sand mixer truck and injecting a displacing fluid into the wellbore to force the particles to enter the fracture, wherein if the wellbore pressure continues to rise and exceeds a predesignated safe pressure, it is assumed that the fracture is successfully plugged by the particles.

5. The method for realizing uniform stimulation for the oil and gas well by multi-stage fracturing according to claim 1, wherein in the Step 6, the specific method is as follows: using a coiled tubing to transport a perforating tool to an aim depth, creating perforation clusters for the hydraulic fracturing, opening a wellhead valve without removing the coiled tubing from the wellbore after perforation, closing a circulating emptying valve, activating a fracturing pump, inject the fracturing fluid for a fracture test, selecting a pump rate based on friction along the downhole and a fracture initiation pressure to create and extend the hydraulic fracture, and recording a fracture pressure at the moment of the fracturing treatment.

6. The method for realizing uniform stimulation for the oil and gas well by multi-stage fracturing according to claim 5, wherein pre-fracturing preparations are required before Step 6, including preparation of fracturing equipment and materials, well site layout and construction inspection.

* * * * *